Nov. 2, 1943.  F. R. HIGLEY  2,333,102
VALVE
Filed Dec. 10, 1940  2 Sheets-Sheet 1
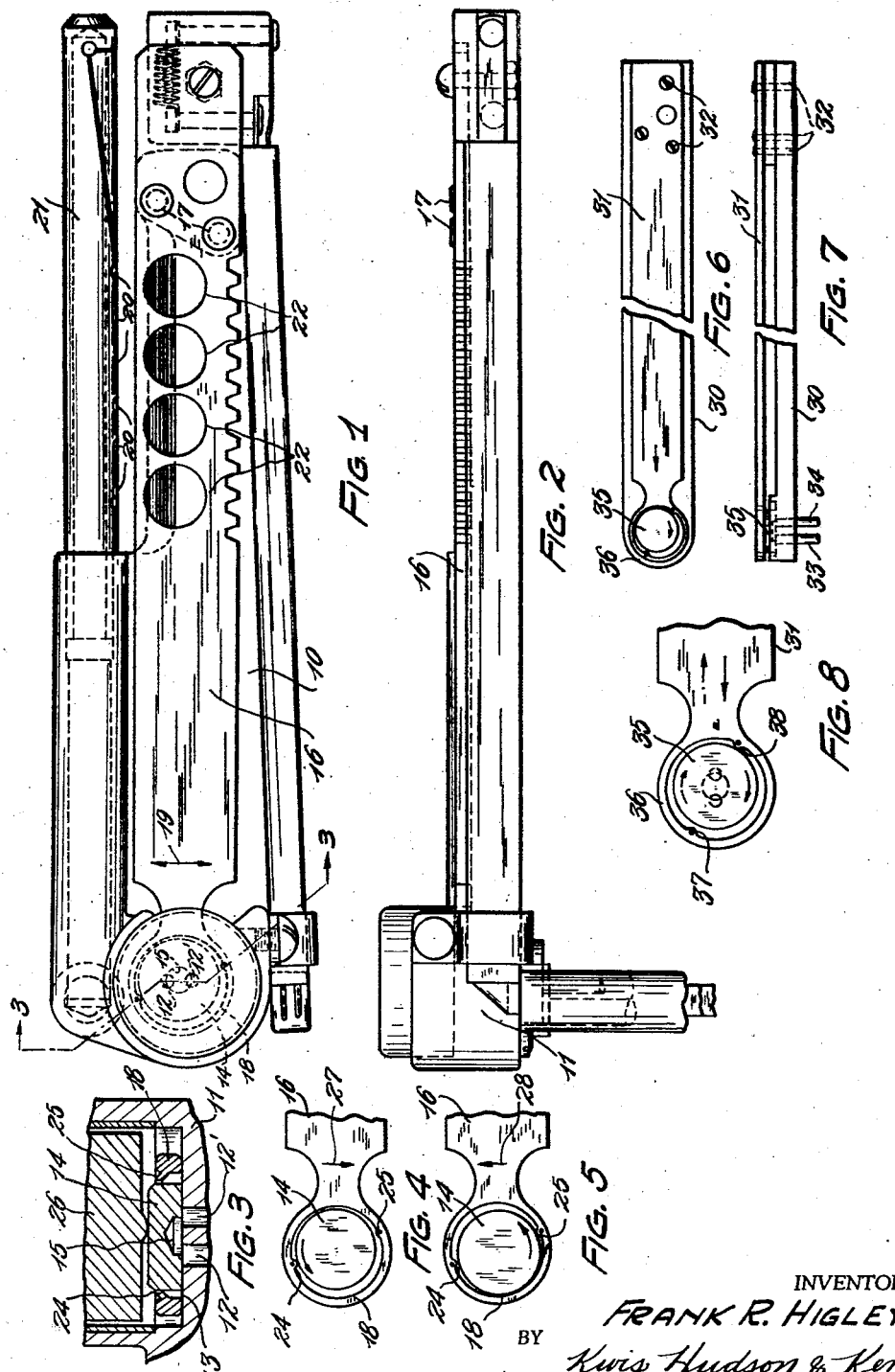
INVENTOR.
FRANK R. HIGLEY
BY Kwis Hudson & Kent
ATTORNEYS Nov. 2, 1943.　　　F. R. HIGLEY　　　2,333,102
VALVE
Filed Dec. 10, 1940　　　2 Sheets-Sheet 2

INVENTOR.
FRANK R. HIGLEY
BY *Kwis Hudson & Kent*
ATTORNEYS

Patented Nov. 2, 1943

2,333,102

UNITED STATES PATENT OFFICE 2,333,102

VALVE

Frank R. Higley, Cleveland Heights, Ohio, assignor to The Bryant Heater Company, Cleveland, Ohio, a corporation of Ohio Application December 10, 1940, Serial No. 369,410

8 Claims. (Cl. 251—18)

This invention relates to improvements in valves, and has reference particularly to actuators for slide valves, especially those subjected to a high degree of heat as in controls for gas and other fluid burners. An example of a control for this purpose is disclosed in my copending application Serial No. 354,061, filed August 24, 1940. In some respects the present invention is an improvement over that disclosed in my copending application Serial No. 354,062, also filed August 24, 1940. In accordance with the invention means are provided for adding to the reciprocatory motion of a valve piece, the purpose of which is to open and close the valve, a cycloidal motion resulting from the reciprocatory motion of the actuator and having a purpose other than the opening and closing of the valve.

One of the objects of the invention is the provision of improved means for imparting rotative impulses to the valve piece during its back and forth travel in opening and closing the valve, thereby insuring even wear upon the bearing surfaces, working out foreign matter which may collect between the bearing surfaces, preventing scratches which would result from the simple reciprocation of particles of foreign matter between the bearing surfaces, and generally assisting in maintaining a tight seal.

Other objects and features of novelty will appear as I proceed with the description of those embodiments of the invention which, for the purposes of the present application, I have illustrated in the accompanying drawings, in which Fig. 1 is a plan view of an oven lighter showing one application of the invention.

Fig. 2 is an elevational view of the same.

Fig. 3 is a detail sectional view on a larger scale, the view being taken substantially on the line 3—3 of Fig. 1.

Figs. 4 and 5 are fragmental plan views showing different positions of the valve actuator and a valve piece actuated thereby.

Figs. 6 and 7 are plan and elevational views respectively of a different form of actuator embodying the invention.

Fig. 8 is a fragmental plan view of one element of the device shown in Figs. 6 and 7, on a somewhat larger scale.

Figure 10:
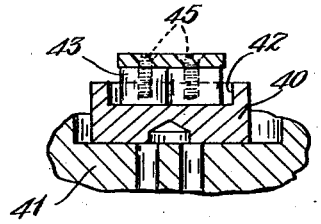
Fig. 10 is a sectional view of the same taken substantially on the line 10—10 of Fig. 9.

Referring first to Figs. 1 to 5 inclusive, 10 is an elongated base member embodying at one end a valve body 11 which may be provided with two or more ports 12 and 12' which open onto a smooth flat surface 13 constituting a bearing for a valve piece 14 of circular disk form having a smooth underside engaging the surface 13 and provided with a central pocket 15 which is adapted to connect the ports 12 and 12' when in one position and to break such connection when in another position.

The means for actuating the valve piece may take different forms. In the case illustrated in Figs. 1 to 5 inclusive it comprises an elongated thermal element 16 which is secured at one end to the base member 10, as by fastenings 17, while at its opposite end it carries a ring 18 which encircles the valve piece 14. The thermal element 16, which preferably has a different coefficient of expansion from that of base member 10, is adapted to be warped or deflected transversely by heating or cooling one edge, whereby its free end swings, as indicated by the double-headed arrow 19, to move the valve from open to closed position and vice versa. A convenient way of heating one edge of the element 16 is by means of small gas flames from ports 20 in a pilot burner 21. A series of holes 22 through the thermal element opposite ports 20 interposes a difficult path for heat conduction across the thermal element and hence facilitates the warping of the element. For a more detailed description of this thermal element and its operation reference may be had to copending application Serial No. 364,532, filed November 6, 1940, by Vilynn O. Beam and myself.

At diametrically opposite points of the ring 18 I form two projections 24 and 25, the parts being so dimensioned that the distance between these projections shall be slightly greater than the diameter of the valve piece 14. The inner diameter of the ring 18 is of course still greater. The projections may be of different shapes and extents circumferentially, but as disclosed herein they may be conveniently formed by the use of a prick punch. The size of these projections and the clearance between the valve piece and the ring are somewhat exaggerated in the drawings. Valve piece 14 may be held in close engagement with the bearing surface 13 by means of a weight 26, see Fig. 3. The ports 12 and 12' are shown connected in Fig. 3. When the valve piece 14 is moved to the right in that figure however the pocket 15 is moved out of register with the port 12 and the valve is thereby closed. Projections 24 and 25 are preferably arranged on a diameter which is disposed at an angle to the direction of valve actuation. The size of this angle may vary through a rather wide range according to the requirements of the case, the larger angles tending to result in rotational impulses of greater extent, but subtracting more from the movement of the valve piece bodily. It will be understood that while the center of the ring 18 moves on an arc, the radius of the arc is so long and the swing of the actuator is so small relative thereto that for practical purposes the actuator movement, if the effect of ambient heat be disregarded, may be considered to be a straight line reciprocation.

When the valve actuator is caused to move in the direction of arrow 27, Fig. 4, projection 24 engages valve piece 14 and imparts to it a rotative impulse counterclockwise until the valve piece assumes the position illustrated in that figure, after which the further travel of the actuator in the direction of arrow 27 transports the valve piece bodily without rotation. On the return stroke of the actuator, that is in the direction of arrow 28, Fig. 5, projection 25 engages the valve piece and imparts to it a further rotative impulse counterclockwise until it assumes the position of Fig. 5 whereupon further movement of the actuator transports the valve piece bodily without rotative movement.

In addition to the rotative impulses on successive strokes of the actuator as above explained, further rotative impulses in the same direction may be imparted to the valve piece if the device is used in a combustion chamber where it is subjected to ambient heat, provided that the thermal element 16 has a different coefficient of expansion than the base member 10. In that event the movement of the actuator back and forth in a longitudinal direction for each cycle of operation will impart rotative impulses although to a much smaller extent than those due to the transverse actuation. These impulses need not be imparted by the projections 24 and 25, but rather may be imparted by inner circular surfaces of the ring.

In a cycle of operation of the burner the lighting of the pilot first causes an expansion of one edge of the thermal element 16 which swings the free end of the latter in the direction of arrow 27. This imparts a rotational impulse to the valve piece 14 and moves it bodily to make or break gas connections operating in any suitable or feasible manner to effect an opening of a main valve, not shown, thereby admitting gas to the main burner which is then ignited by flame from the pilot. A period of operation of the main burner within a closed combustion chamber of course raises the ambient temperature therein, causing the thermal element 16 to expand longitudinally relative to the base member 10, which imparts another, although relatively small, impulse to the valve piece 14 in the same rotational direction. Now assuming that the heat requirements are satisfied and that the main burner and pilot are turned off simultaneously or substantially so, then the thermal element 16 will quite rapidly swing back in the direction of arrow 28, moving the valve piece bodily to its original position and at the same time imparting a third rotational impulse in the same direction as the previous ones. Finally the temperature in the combustion chamber will fall gradually and the thermal element 16 will contract relatively to the base member 10, imparting a fourth small rotative impulse to the valve piece.

The two projections 24 and 25 must be spaced apart a distance slightly greater than the diameter of the valve piece, that is there must be sufficient clearance between these projections and the valve piece to permit movement of the valve piece with respect to the actuator. This clearance therefore may be of a very small order. Clearance between the valve piece and the inner diameter of the ring at other points, particularly points spaced 90° from the projections, determines the amount of rotational impulse imparted to the valve piece for each stroke of the actuator, that is to say at the beginning of each stroke a certain part of that stroke is consumed in imparting a rotational impulse to the valve piece, and that part must be subtracted from the total stroke in order to arrive at the part available for bodily movement of the valve piece. The greater the clearance between the ring and the valve piece the greater will be the valve piece rotation and the less will be its bodily movement. In control apparatus of the kind for which the invention is primarily intended, that is gas burning equipment, it is generally desirable to take advantage of as much movement as possible for valve reciprocation, while the amount of rotational movement may be very small and still be sufficient to turn the valve piece enough to avoid the difficulties which would attend a pure reciprocation. Hence in this particular application of the invention, at least, I prefer to keep the clearance between the ring and the valve piece relatively small.

In Figs 6, 7 and 8 the invention is shown applied to a thermostatic device of a different character, embodying a base member 30 with a thermal element 31, these two parts being formed of materials of different coefficients of expansion and being fastened together at one end by screws, rivets, or the like 32. The parts 30 and 31 are rather long as compared with the corresponding parts in Figs. 1 and 2, in order that their elongation differential may be sufficient to effect a substantial relative movement at their free ends. The base member 30 carries a valve body with which are connected two gas conductors 33 and 34 registering with ports in the valve body, which ports are arranged in alignment lengthwise of the device, rather than transversely as in the first described form of the invention, because the principal valve movement must be in the longitudinal rather than in the transverse direction. The valve piece shown at 35 may be identical with that previously described. It is encircled by a ring 36 formed at the end of thermal element 31, and projections 37 and 38 are caused to extend inwardly from the ring in the same manner as the projections 24 and 25. Rotative impulses in the same direction indicated by arrows in Fig. 8 are imparted during successive strokes of the device, but in this instance there are two such impulses only for each complete cycle, since the movements of the actuator are due to ambient heat only.

Figure 9:
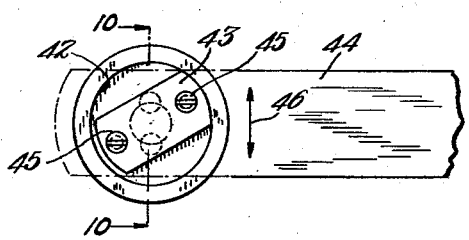
Fig. 9 is a partial plan view of a modified form of the invention.

Referring now to Figs. 9 and 10, the valve piece 40 and the valve body 41 occupy the same relative positions as in the previously described forms of the invention, and are similar in construction except that the valve piece has a circular cavity 42 in its upper side. An actuator block 43 is attached to a thermal element 44, which may be similar to the element 16, by means of screws 45 or the like. The ends of this block are spaced apart a distance slightly less than the diameter of the cavity 42 and are disposed at an angle to its direction of reciprocation indicated by the double-headed arrow 46 in Fig. 9. When the actuator moves in one direction the wall of the cavity is engaged on one side of the line 10—10, Fig. 9, and when it moves in the other direction the wall of the actuator is engaged on the opposite side of that line. As in the previously described forms of the invention this results in rotational impulses in the same direction in addition to the bodily movements of the valve. It is apparent therefore that the actuator in this instance functions the same as before except that it works upon an internal surface of the valve piece rather than upon an external surface thereof.

Figure 11:
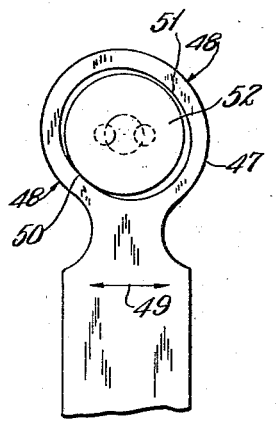
Figs. 11 and 12 are fragmental plan views of actuators and valve pieces comprising further modifications of the invention.

In that form of the invention illustrated in Fig. 11 the ring 47 of the actuator is first formed as a true circular ring and thereafter is pinched between two forces indicated by the arrows 48 to make the ring slightly ellipsoidal. Consequently, when the actuator swings in the directions indicated by the double-headed arrow 49, those portions 50 and 51 of the actuator which are closest together alternately engage the valve piece 52 and impart rotational impulses at the beginning of each stroke.

Figure 12:
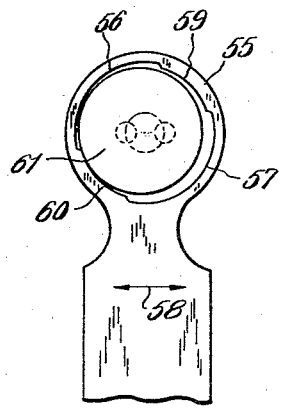

In the modification of Fig. 12 a ring 55 is first formed with a circular hole therethrough, and then this hole is broached out slightly in opposed portions 56 and 57. Now in this case when the actuator swings in the directions indicated by the double-headed arrow 58 the unbroached portions 59 and 60 of the ring engage the valve piece 61 and impart rotational impulses thereto in a manner similar to what occurs in the forms of the invention hereinbefore described.

In all forms of the invention the actuator, it will be observed, is provided with means for engaging the valve piece alternately on opposite sides of the path of movement of its center. It is because of this fact that a simple movement of reciprocation may be utilized to produce rotational impulses. If the actuator ring had a truly circular inner wall throughout its extent it would engage the valve piece on the center line of its path of movement and would impart no rotational impulses.

The valve piece, except as to the form illustrated in Figs. 9 and 10, must be symmetrical about its axis normal to its principal plane. While here shown as circular it may have a multiplicity of flat edge faces or have a roughened or toothed edge surface, but in any event it will be generally circular in form. The inner wall of the embodiment of Figs. 9 and 10 must also be generally circular.

While in the various figures of the drawings I have shown the valve piece as provided with a single pocket for connecting or breaking contact between two conductors, it is of course within the purview of the invention to add further pockets or further ports in the valve body, and in fact the valve piece may be formed without any pockets and be used merely to cover and uncover a single port, as where the valve piece is employed to vent a passage or chamber at intervals.

Having thus described my invention, I claim:

1. In combination, a valve body, a valve piece movable relatively thereto, an actuator for said valve piece movable back and forth in a given direction to move the valve piece bodily, said actuator having opposed projections arranged to contact said valve piece alternately on opposite sides of the path of the valve piece center during successive strokes of the actuator, whereby progressively rotative impulses in small increments are imparted to the valve piece during its back and forth travel.

2. In combination, a valve body, a generally circular valve piece movable relatively thereto, an actuator for said valve piece movable back and forth in a given direction, said actuator having a ring surrounding the valve piece, said ring having opposed internal projections arranged to contact said valve piece alternately on opposite sides of the path of its center during successive strokes of the actuator, whereby progressively rotative impulses in small increments are imparted to the valve piece during its back and forth travel.

3. In combination, a valve body, a generally circular valve piece movable relatively thereto, an actuator for said valve piece movable back and forth in a given direction, said actuator having opposed portions spaced apart a distance slightly greater than the diameter of the valve piece disposed to engage the valve piece alternately on opposite sides of the path of its center, said actuator having other portions centered about a diameter at right-angles to the line connecting said first named portions and spaced from each other by a distance somewhat greater than said first named portions for confining the movements of the valve, whereby at the beginning of each stroke of the actuator a rotational impulse is imparted to the valve piece, said impulses being cumulative to gradually turn the valve piece.

4. In combination, a valve body, a generally circular valve piece movable relatively thereto, an actuator for said valve piece movable back and forth in a given direction, said actuator having a ring surrounding the valve piece provided with opposite inwardly extending projections spaced apart a distance slightly greater than the diameter of the valve piece, disposed to engage the valve piece alternately on opposite sides of the path of its center during successive strokes of the actuator, whereby progressively rotative impulses in small increments are imparted to the valve piece during its back and forth travel.

5. In combination, a valve body, a valve piece movable relatively thereto, said valve piece having a circular wall, an actuator for said valve piece movable back and forth in a given direction, said actuator having diametrically aligned projections adapted to engage said circular wall initially on each stroke, said projections being disposed for engagement with said circular wall on opposite sides of the path of its center alternately during successive strokes of the actuator, whereby progressively rotative impulses in small increments are imparted to the valve piece during its back and forth travel.

6. In combination, a valve body, a generally circular valve piece movable relatively thereto, an actuator for said valve piece movable back and forth in a given direction, said actuator having opposed projections spaced apart a distance slightly greater than the diameter of the valve piece, so disposed as to engage the valve piece alternately on opposite sides of the path of its center during successive strokes of the actuator, whereby progressively rotative impulses in small increments are imparted to the valve piece during its back and forth travel.

7. In combination, a relatively fixed valve body, a generally circular valve piece movable relatively thereto, an actuator loosely engaging the valve piece having opposed primary motions in opposite directions for opening and closing the valve and having secondary opposed motions substantially at right angles to the said primary motions, said primary motions occurring as one and three of the series and said secondary motions occurring as two and four of the series, said actuator having opposed projections adapted to engage the valve piece alternately on opposite sides of the path of its center during said primary motions, whereby rotative impulses in small increments are imparted to the valve piece by said opposed projections, and said actuator having other portions intermediate said first-named portions adapted to engage the valve piece during said secondary motions for imparting further rotative impulses to the valve piece, all of said impulses being in the same direction.

8. In combination, a relatively fixed valve body, a generally circular valve piece movable relatively thereto, an actuator comprising a ring loosely surrounding the valve piece, said actuator being adapted to impart to said ring opposed primary motions in opposite directions for opening and closing the valve and being adapted to impart secondary motions in opposite directions substantially at right angles to the said primary motions, said primary motions occurring as the first and third of the series of motions and said secondary motions occurring as the second and fourth of said series, said ring having opposed inwardly projecting portions adapted to engage the valve piece alternately on opposite sides of the path of its center during said primary motions, whereby rotative impulses are imparted to the valve piece during the said primary motions of the ring and rotative impulses of less magnitude but in the same direction are imparted to the valve piece during the said secondary motions of the ring.

FRANK R. HIGLEY.